April 23, 1957 — R. BUSBACH — 2,789,934

PROCESS FOR LINING A SYSTEM OF PIPES

Filed May 10, 1955

United States Patent Office 2,789,934
Patented Apr. 23, 1957

2,789,934
PROCESS FOR LINING A SYSTEM OF PIPES

Reinhard Busbach, Hagen, Westphalia, Germany, assignor to Accumulatoren-Fabrik Aktiengesellschaft, Hagen, Westphalia, Germany Application May 10, 1955, Serial No. 507,401

3 Claims. (Cl. 154—82)

The present invention relates to linings for pipes and pipelines. Industrial pipelines, particularly lines through which corrosive liquids are piped, often have an intricate course including branch lines, joints, bends, and the like. In view of the nature of the liquids, uncoated iron cannot be used for such pipelines. Attempts have been made to employ lines of plastic materials or iron pipes coated with rubber, which is cast or sprayed on from dispersions. Straight pipes or pipes without complicated course can be lined with laminated hard rubber or rubber tubes, which are subsequently vulcanized.

Lines which are made of plastics alone have the inconvenience of being breakable and of low resistance to heat. Pipes lined with rubber coatings from aqueous dispersions acquire a layer of rubber which will not be sufficiently dense for most purposes.

The lining which up to now proved to be best was that in the form of laminated material or tubes. However, the condition had to be fulfilled that in complicated pieces, such as T-shaped attachments, pieces with several branchings, bends, or constrictions, every part must be accessible to the hand of an operator or, at least, to a short tool.

In pipes of larger diameter, of about 100 mm. and more, this is possible in most cases. With narrower pipes into which a hand cannot be inserted, much is left to chance.

It has been attempted to cut holes into the inserted tube of one pipe, by means of long and partly bent knives, and then to insert a tube into the branch pipe, and to join the tubes with a hook, trying to rely on touch when pressing the parts together. This, however, is a difficult task with uncertain results.

It is the object of the present invention to overcome the above mentioned drawbacks and to provide a process which is simple and results in a positive joining of the pipe linings in branched pipes.

According to the invention, a tube of corrosion-proof material, e. g. unvulcanized rubber or a thermoplastic, is drawn into the main pipe, which may be straight or bent; then, a tube of the same material is inserted into the branched piece, which tube abuts on the main tube. The secondary tube is preferably cut out at its end so as to correspond to the circumference of the main tube so that the secondary tube will lie closely against the main tube along the entire abutment joint. The secondary tube is then firmly pressed against the wall of the branched pipe with a rod. Thereafter, one end of the main pipe is closed in an air-tight manner and through the other end compressed air is blown into the pipe. During this operation, the compressed air presses the tube in the main pipe, which is still in plastic condition, into the branch pipe, where it forms a bubble and bursts. The main tube near the place where the bubble bursts comes to lie closely against the tube of the branch pipe which has previously been pressed against the wall.

The invention will now be more fully described by way of example, but it should be understood that this is given by way of illustration and not of limitation and that many changes can be made in the details without departing from the spirit of the invention.

In the three figures, numeral 1 designates an iron pipe, numeral 2 a tube of a moldable material in the main pipe line, and numeral 3 a tube of the same material in the branch.

Figure 1:
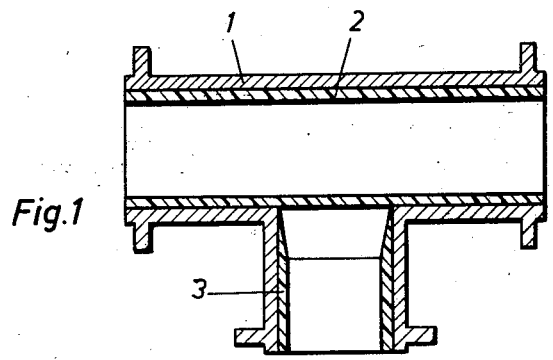
Fig. 1 shows a pipe system with a main pipe and a branched pipe.
Figure 2:
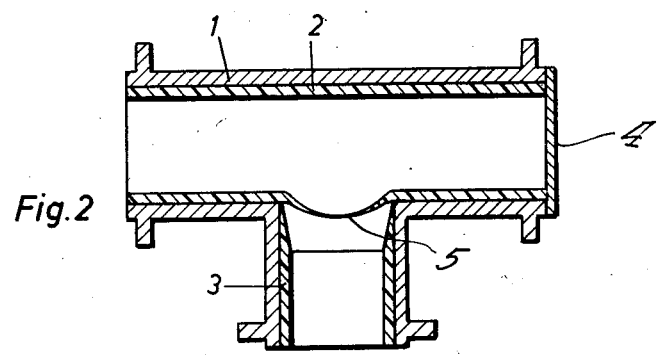
Fig. 2 is a similar showing in which the process of inserting a lining is illustrated.

Numeral 4 in Fig. 2 designates a lid for air-tight sealing. Compressed air is introduced into this pipe as indicated by the arrow. At 5, a bubble is shown in formation.

Figure 3:
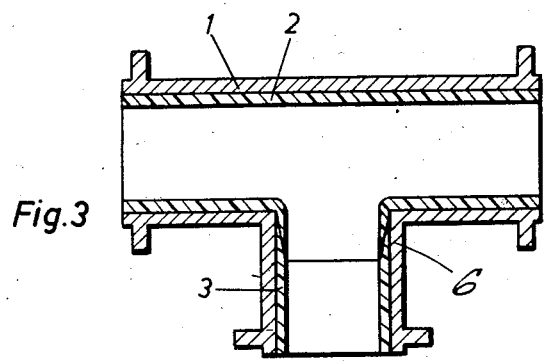
Fig. 3 shows the finished lined pipe system.

Fig. 3 illustrates the pipes after the bubble has burst; the broken ends of the tube lining 2 are in close abutment against the ends of tube 3 and both tubes are securely joined at 6.

Instead of one branch pipe, several branches can be present. If in such a case not all the bubbles burst simultaneously, those branches can be closed in which the bubbles have already burst, whereafter upon further introduction of compressed air the last bubble will likewise burst.

As lining materials unvulcanized hard rubber, soft rubber, or a thermoplastic can be used.

When unvulcanized rubber is used, this has to be vulcanized in a subsequent operation. When a thermoplastic material is used, it has to be heated in order to exhibit satisfactory moldability. This heating may, e. g. be effected by the use of heated compressed air.

What I claim is:

1. A process for lining a system of pipes including a main pipe and branch pipes with tubes of corrosion-proof moldable material which comprises introducing a tube of said material into said main pipe, introducing tubes of said material into said branch pipes, closing one end of said main pipe in an air-tight manner, thereafter passing compressed air from the other end into the main pipe so as to force the tube therein into the branch pipes and continuing said action until a bubble formed in the tube lining of the main pipe bursts and causes the resulting ends to unite with the tube lining of the branch pipes.

2. A process according to claim 1, wherein the moldable material used for lining the pipes is unvulcanized rubber, which is vulcanized in a subsequent operation.

3. A process according to claim 1, wherein the moldable material is a thermoplastic and the compressed air is heated.

References Cited in the file of this patent
UNITED STATES PATENTS 2,349,177    Kopitke _____ May 16, 1944